United States Patent [19]

Hane

[11] Patent Number: 4,695,076
[45] Date of Patent: Sep. 22, 1987

[54] POSITION ADJUSTING DEVICE FOR MOVABLE ANCHOR LATCH MECHANISM

[75] Inventor: Toshiyuki Hane, Kanagawa, Japan
[73] Assignee: NSK-Warner K.K., Tokyo, Japan
[21] Appl. No.: 942,637
[22] Filed: Dec. 17, 1986
[30] Foreign Application Priority Data Dec. 25, 1985 [JP] Japan .................. 60-198298

[51] Int. Cl.⁴ .......................................... B60R 22/06
[52] U.S. Cl. ..................... 280/804; 280/808; 297/483
[58] Field of Search ............. 280/801, 802, 804, 808; 297/468, 483, 486

[56] References Cited

U.S. PATENT DOCUMENTS

| 4,256,331 | 3/1981 | Schwanz et al. | 280/804 |
|---|---|---|---|
| 4,302,031 | 11/1981 | Nishimura et al. | 280/804 |
| 4,394,036 | 7/1983 | Hildebrandt | 280/804 |
| 4,456,283 | 6/1984 | Michael et al. | 280/804 |
| 4,491,344 | 1/1985 | Fohl | 280/808 |
| 4,573,709 | 3/1986 | Kawai et al. | 280/804 |
| 4,597,588 | 7/1986 | Kawai | 280/808 |
| 4,607,863 | 8/1986 | Yokote | 280/804 |

FOREIGN PATENT DOCUMENTS

3317957A1 11/1984 Fed. Rep. of Germany .
60-135248 9/1985 Japan .

Primary Examiner—John J. Love
Assistant Examiner—Kenneth R. Rice
Attorney, Agent, or Firm—Wegner & Bretschneider

[57] ABSTRACT

A position adjusting device is provided for use with a movable anchor latch mechanism. The device includes a drive means for causing a movable anchor to move between an occupant releasing position and an occupant restraining position, a latch mechanism for latching the movable anchor at the occupant restraining position when the movable anchor has reached the occupant restraining position, an adjusting means for fixing the latch mechanism at a desired position, and a release means for detecting that the adjusting means is about to be operated, whereby the movable anchor assuming the occupant restraining position is released from the occupant restraining position.

25 Claims, 19 Drawing Figures

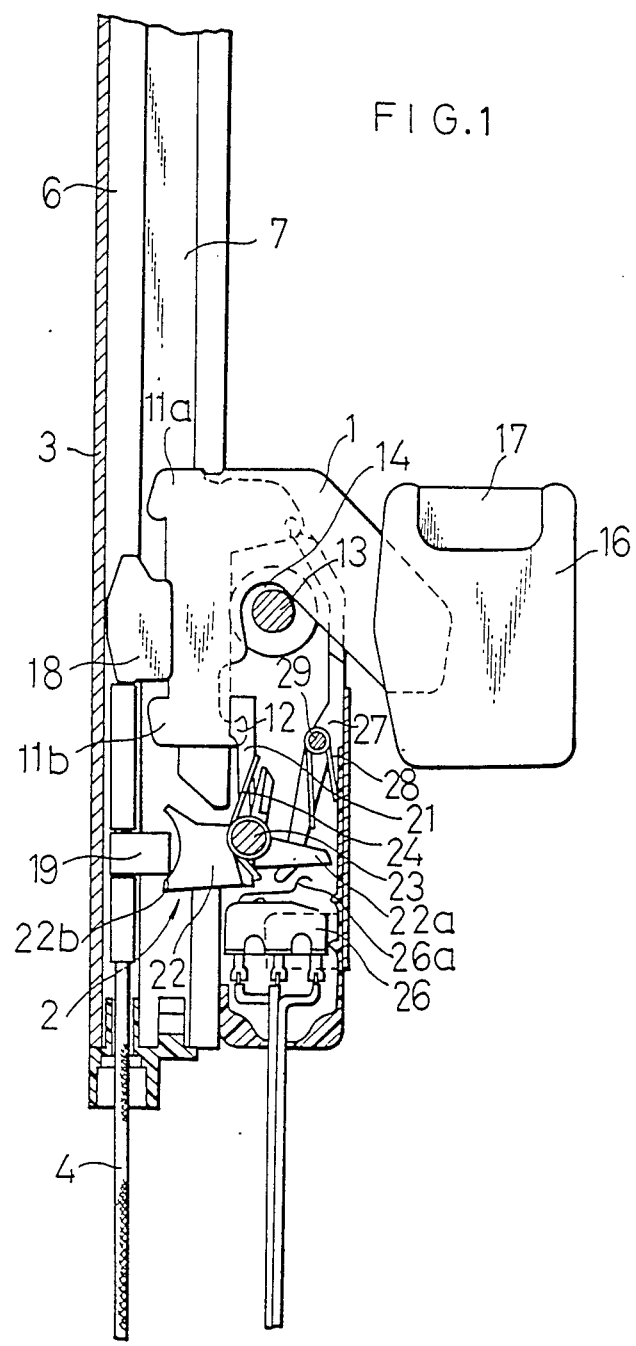

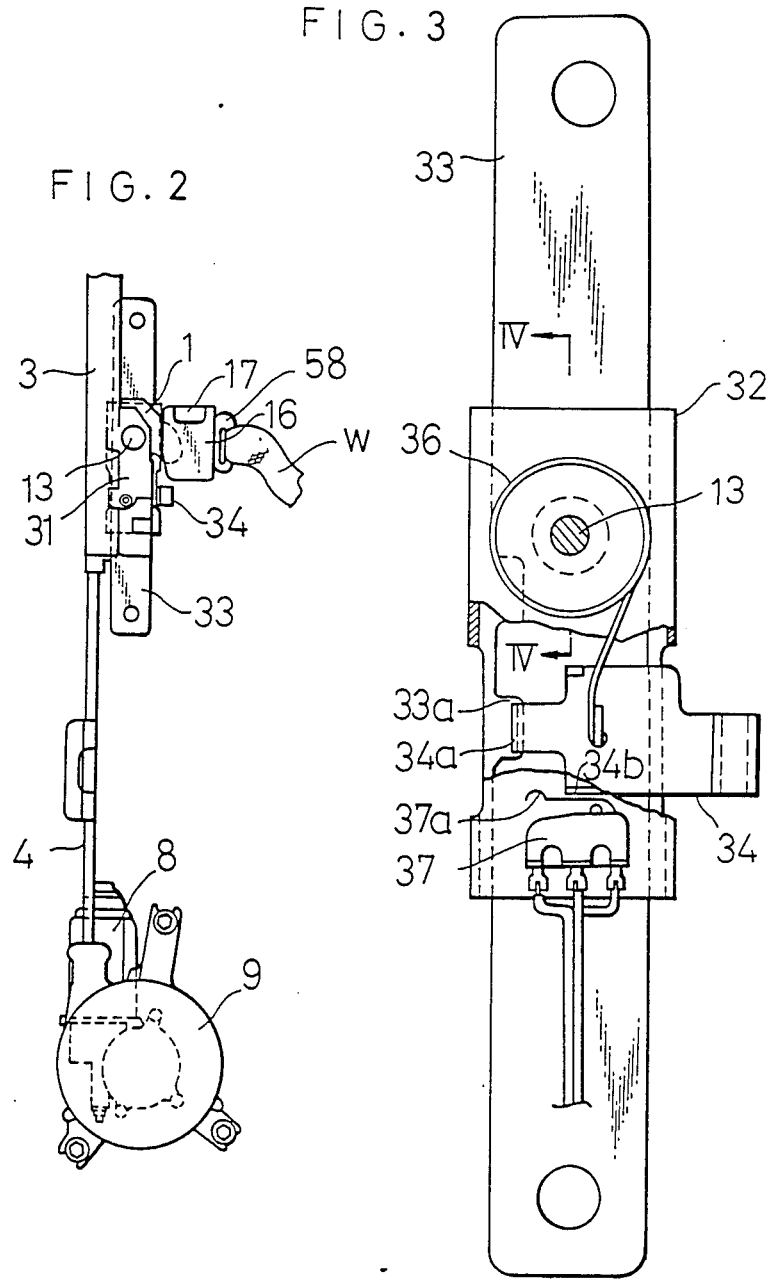

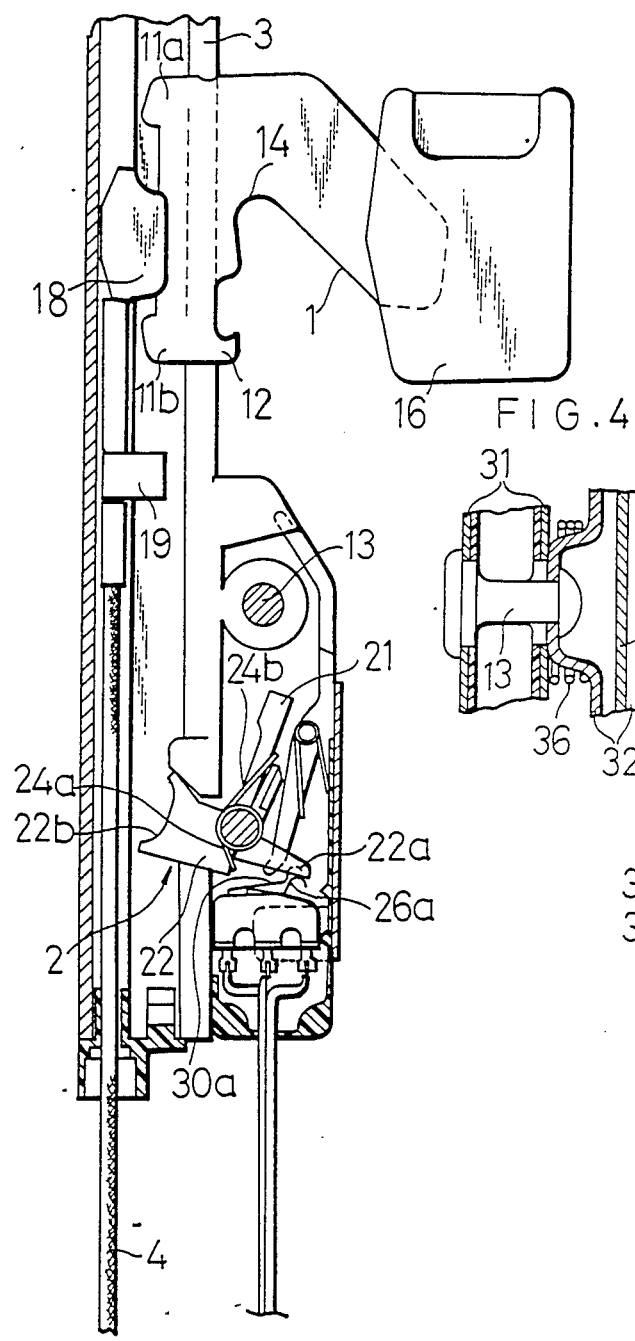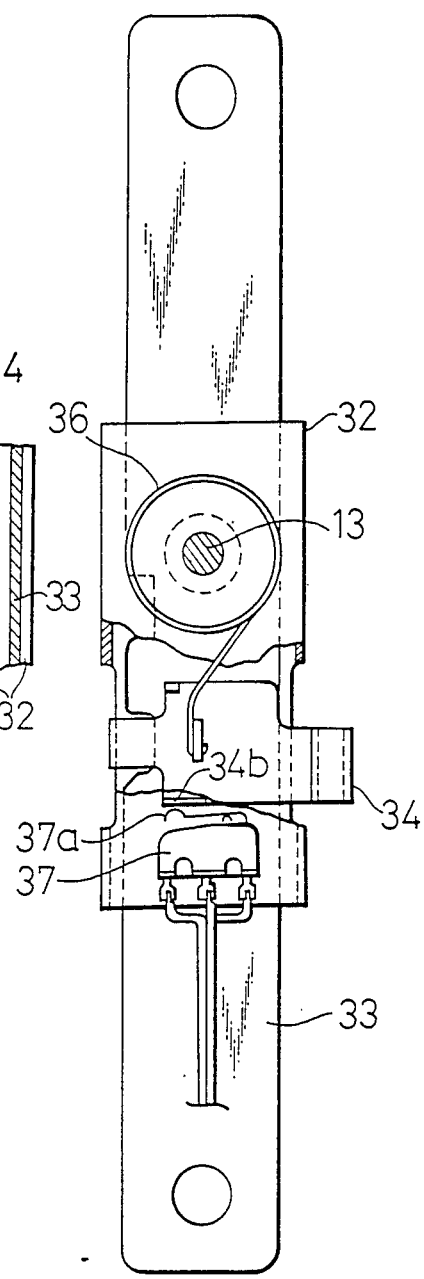

4,695,076

POSITION ADJUSTING DEVICE FOR MOVABLE ANCHOR LATCH MECHANISM

BACKGROUND OF THE INVENTION

1. Field of the Invention

This invention relates to a position adjusting device for a movable anchor latch mechanism in an automatic seat belt system, and specifically to a position adjusting device in which a movable anchor is automatically released from the latch mechanism upon positional adjustment of the latch mechanism, whereby the positional adjustment of the latch mechanism is facilitated.

2. Description of the Prior Art

There are conventionally known seat belt systems in which a movable anchor is brought respectively to an occupant releasing position and an occupant restraining position in response to each opening and closing of an associated door and the movable anchor is latched by a latch mechanism at the occupant restraining position. In such known devices, the following problems however arise if a position adjusting device is provided for the movable anchor latch mechanism in order to adjust the fixed position of the latch mechanism and hence to adjust the occupant restraining position at which the movable anchor is latched by the latch mechanism.

If a positional adjustment is attempted while the movable anchor is at the occupant restraining position, the operation of the positional adjustment encounters extreme difficulties since the latch mechanism and movable anchor are connected to each other and not only the movable anchor but also a wire or tape for driving the movable anchor and a drive shaft of a motor for driving the wire or tape, etc. must also be moved along with the latch mechanism. In order to adjust the occupant restraining position of the movable anchor to avoid the above-mentioned difficulties, it may be contemplated to open the door in advance so as to actuate a drive means composed of the motor, etc. and to release the movable anchor from the occupant releasing position, followed by an adjustment of the fixed position of the latch mechanism. This method however requires opening and closing of the door upon every positional adjustment and is hence extremely irksome. Further, it is extremely dangerous to open the door in the above-described manner while the vehicle is driven or is stopped at a stop signal. As a matter of fact, it is extremely difficult to adjust the position of the latch mechanism once the vehicle is started.

SUMMARY OF THE INVENTION

An object of this invention is therefore to provide a position adjusting device for a movable anchor latch mechanism, which device is free of the above-described problems.

In one aspect of this invention, there is thus provided a position adjusting device for a movable anchor latch mechanism, comprising:

a drive means for causing a movable anchor to move between an occupant releasing position and an occupant restraining position, thereby allowing an associated webbing to take an occupant releasing state and an occupant restraining state selectively;

a latch mechanism for latching the movable anchor at the occupant restraining position when the movable anchor has reached the occupant restraining position;

an adjusting means for fixing the latch mechanism at a desired position; and a release means for detecting that the adjusting means is about to be operated, whereby the movable anchor assuming the occupant restraining position is released from the occupant restraining position.

In another aspect of this invention, there is also provided a position adjusting device for a movable anchor latch mechanism, comprising:

a guide rail;

a movable anchor movable along the guide rail, said movable anchor carrying a webbing connected thereto;

a drive means for causing the movable anchor to move between an occupant restraining position, where the webbing restrains an occupant, and an occupant releasing position where the webbing is maintained out of engagement with the occupant;

a means for holding the movable anchor at the occupant restraining position;

a means for supporting the holding means in a state that the position of the holding means is adjustable; and a means for actuating the movable anchor from the occupant restraining position toward the occupant releasing position upon operation of the support means.

In a further aspect of this invention, there is also provided a position adjusting device for a movable anchor latch mechanism, comprising:

a guide rail;

a movable anchor movable along the guide rail, said movable anchor carrying a webbing connected thereto;

a drive means for causing the movable anchor to move between an occupant restraining position, where the webbing restrains an occupant, and an occupant releasing position where the webbing is maintained out of engagement with the occupant, said occupant restraining position being adjustable;

a means for positioning the occupant restraining position at a desired position; and a means for generating warning while the positioning means is operated.

According to the present invention, a movable anchor drive means such as wire is automatically actuated by making use of a movement of a member which moves upon a positional adjustment, whereby the movable anchor is released from the latch mechanism in advance. The present invention has therefore materialized a position adjusting device permitting an adjustment of the fixed position of the latch mechanism by a simple operation.

BRIEF DESCRIPTION OF THE DRAWINGS

The above and other objects, features and advantages of the present invention will become apparent from the following description and the appended claims, taken in conjunction with the accompanying drawings, in which:

FIG. 1 is a detailed illustration of a latch mechanism;

FIG. 2 is an overall illustration of a latch mechanism, in which a position adjusting device according to one embodiment of this invention has been incorporated, and a drive means;

FIG. 3 is a plan view of the position adjusting device according to the one embodiment of this invention;

FIG. 4 is a cross-sectional view taken along line IV—IV of FIG. 3;

FIG. 5 is similar to FIG. 1 and illustrates the operation of the position adjusting device;

FIG. 6 is similar to FIG. 3 and illustrates the operation of the position adjusting device;

DETAILED DESCRIPTION OF THE INVENTION AND PREFERRED EMBODIMENTS

Figure 7:
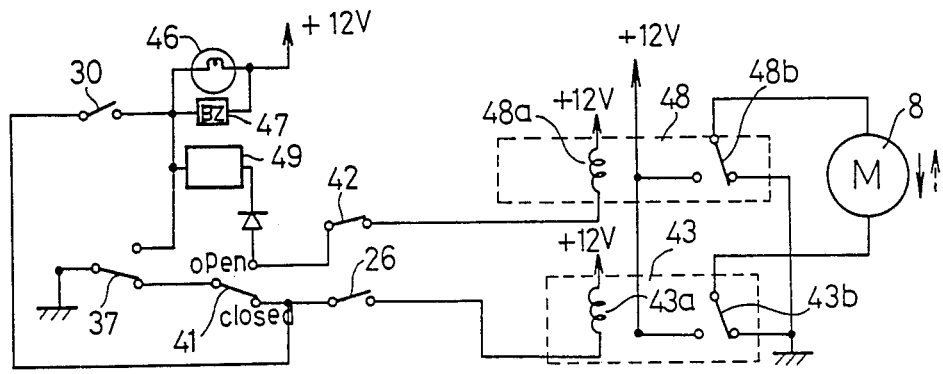
FIG. 7 is a circuit diagram showing one example of an electrical circuit including both release means and drive means.

FIG. 1 shows a movable anchor 1 latched by a latch mechanism 2 at an occupant restraining position. The occupant restraining position is located inside a center pillar of a vehicle at a point the way down toward the floor of the vehicle. On a guide rail 3 which extends almost horizontally along a side roof inside the vehicle, is bent down and extends further through the center pillar, there are formed a guide channel 6, along which a wire 4 is guided, and a slide channel 7 along which the movable anchor 1 is caused to slide. As illustrated in FIG. 2, the wire 4 is taken up on a reel 9 and is released by a motor 8 which is mounted on the vehicle at a point below the occupant restraining position.

The movable anchor 1 has a pair of sliding portions 11a, 11b formed in opposition to each other with an interval therebetween, a hook 12, and a notch 14 formed in such a way that the notch 14 receives an anchor pin 13, which is provided on the side of the latch mechanism, at the occupant restraining position. In addition, an emergency release buckle (hereinafter abbreviated as "ERB") 16 is fixedly secured on the movable anchor 1. A tongue 58 connected with a webbing W is normally inserted in the ERB 16. The tongue 58 is released from the ERB 16 when a push button 17 is pressed.

A drive block 18, which is movable relative to the movable anchor 1 between the sliding portions 11a and 11b, is fixedly secured on the leading end of the wire 4. An actuator block 19 is also attached on the wire 4 with a prescribed interval from the drive block 18.

The latch mechanism 2 has a rollover latch member 21 engageable with the hook 12 of the movable anchor 1 so as to latch the movable anchor at the occupant restraining position, a cam member 22 adapted to control the rollover latch member 21 in a manner to be described subsequently, and a return spring 24 urging the rollover latch member 21 under a mild force about a pin 23 in a direction, in which the rollover latch member 21 is brought into engagement with the hook 12 (in a counterclockwise direction as viewed in FIG. 1), and urging the cam member 22 under a force stronger than the mild force about the pin 23 in a clockwise direction as viewed in FIG. 1.

The cam member 22 has a leg portion 22a. When the movable anchor has moved to the occupant restraining position, i.e., the rear end position and the cam member 22 is at the position shown in FIG. 1, the leg portion 22a is remote from a lead 26a of a rear end switch 26 and maintains a switch 26, which is assembled in an electrical circuit including the motor 8, in an open state. When the movable anchor 1 has moved away from the occupant restraining position and the cam member 22 has been turned clockwise by the force of the return spring 24 on the other hand (see, FIG. 5), the leg portion 22a pushes the lead 26a so as to bring the rear end switch 26 into a closed state.

It is detected by a lever member 27 whether the ERB 16 is at the occupant restraining position with an associated tongue latched therein. When the tongue is not latched or the ERB 16 is not at the occupant restraining position, the lever 27 is located at the position shown in FIG. 1. When the tongue is latched and the ERB 16 assumes the occupant restraining position, the lever member 27 is turned about a pin 29 against the force of a spring 28 in a counterclockwise direction as viewed in FIG. 1 so that the lever member 27 acts on a lead 30a of a buckle switch 30 (see, FIG. 5). The buckle switch 30 will be described subsequently.

As shown in FIG. 4 which is the cross-sectional view taken along line IV—IV of FIG. 3, the latch mechanism 2 is sandwiched by a base member 31 which is in turn connected by an anchor pin 13 to an adjustable anchor 32 which is located behind the drawing sheet of FIG. 1. The adjustable anchor 32 is mounted movably on a base 33 which extends vertically along the center pillar and is fixed on the side of the vehicle. The adjustable anchor 32 is hence guided together with the latch mechanism 2 by the base 33, whereby the fixed position of the adjustable anchor 32 can be adjusted. When a position adjusting lever 34 provided movably on the adjustable anchor 32 is maintained at the position shown in FIG. 3, i.e., in a deactivated position owing to the urging force of a return spring 36 and a lock portion 34a is at a lock position where the lock portion 34a is in engagement with one of plural teeth 33a of the base 33, the adjustable anchor 32 and latch mechanism 2 are fixed at their adjusted positions. When the position adjusting lever 34 is moved manually in a leftward direction as viewed in FIG. 3 against the force of the return spring 36 and the lock portion 34a is brought into an operated state (see, FIG. 6) where the lock portion 34a is maintained out of engagement with all of the teeth 33a (maintained at a non-locking position), the positions of the adjustable anchor 32 and latch mechanism 2 are rendered adjustable along the base 33. Here, the movement of the position adjusting lever 34 is detected as a result that a shoulder portion 34b of the position adjusting lever 34 presses a lead 37a of a release switch 37, a detection means in a below-described electrical circuit, as shown in FIG. 6. As a consequence, the motor 8 is turned on and the movable anchor 1 begins to move away from the occupant restraining position 1.

Based on the above description of the position adjusting device, its operation will next be described with reference to the electrical circuit shown in FIG. 7.

When the associated door is closed by an occupant, the door switch 41 is switched over to the closed side. At this time, the movable anchor 1 is at the front end, i.e., at the occupant releasing position. The rear end switch 26, which takes an open position only when the movable anchor 1 is at the rear end position, is in a closed state. Accordingly, a current is caused to flow to an exciting coil 43a of a relay 43 so that a switch 43b is switched over to the lefthand side as viewed in FIG. 7. A current is therefore caused to flow through the motor 8 in a direction indicated by an dashed arrow, thereby beginning to take up the wire 4 on the reel 9. As a result, the drive block 18 is brought into contact with the sliding portion 11b of the movable anchor 1 so that the wire 4 is gradually taken up while causing the movable anchor 1 to slide toward the rear end. Here, a front end switch 42 which can take an open state only when the movable anchor 1 at the front position is closed.

As the movable anchor 1 approaches the occupant restraining position where the latch mechanism 2 is provided, the actuator block 19 is brought into contact with the actuated portion 22b of the cam member 22 which is in the state shown in FIG. 5, thereby begining to turn the cam member 22 in a counterclockwise direction against the strong clockwise urging force of the first leg portion 24a of the return spring 24. As a result, the rollover latch member 21, which has been maintained at the position shown in Fig. 5 against the mild counterclockwise biasing force of the second leg portion 24 of the return spring 22, starts turning counterclockwise as viewed in FIG. 5 by the mild biasing force. Since the hook 12 of the movable anchor 1 has moved to the same point as the rollover latch member 21 has turned to by that time, the hook 12 and rollover latch member 21 are brought into engagement as illustrated in FIG. 1. The movable anchor 1 is latched at the occupant restraining position in the above-described manner. Hence, the webbing W connected with the movable anchor 1 is also maintained in the occupant restraining state.

Here, the leg portion 22a of the cam member 22 is moved away from the lead 26a so that the rear end switch 26 is brought into an open state. The exciting coil 43a of the relay 43 is hence brought into a nonexcited state, thereby turning the switch 43b to the righthand side as viewed in FIG. 7 and stopping the motor 8. When the tongue is latched correctly in the ERB 16 at this point of time, the lever member 27 is turned counterclockwise as viewed in FIG. 1 and is hence caused to act on the lead 30a of the buckle switch 30, thereby to bring the switch 30 into an open state. If the tongue is not latched in the ERB 16, the buckle switch 30 remains in its closed state. In this case, a lamp 46 is turned on and a buzzer 47 generates a warning sound, thereby recommending the occupant to latch the tongue into the ERB 16.

Incidentally, the anchor pin 13 is maintained in contact with the notch 14 of the movable anchor 1 at the occupant restraining position so as to receive loads to be applied to the webbing.

When the movable anchor 1 is at the occupant restraining position as shown in FIG. 1, the door switch 41 is changed over to the open side when the door is opened. Since the front end switch 42 is in its closed state at this point of time, a current is fed to the exciting coil 48a of the relay 48 and the switch 48b is changed over to the lefthand side as viewed in FIG. 7. As a consequence, a current is caused to flow through the motor 8 in a direction indicated by a solid arrow, thereby beginning to pay out the wire 4 from the reel 9.

Then, the actuator block 19 starts moving upwards as viewed in FIG. 1 so as to move away from the actuated portion 22b of the cam member 22. As a result, the cam member 22 begins to turn clockwise as viewed in FIG. 1 in accordance with the strong urging force of the cam member 22 and at the same time, the rollover latch member 21 turns clockwise against the mild urging force so as to move away from the hook 12. At the same time, the drive block 18 is brought into contact with the sliding portion 11a of the movable anchor 11 and the wire 4 moves together with the movable anchor 1 toward the front end. In this manner, the movable anchor 1 reaches the front end, i.e., the occupant releasing position so that the front end switch 42 is brought into its open state and the motor 8 is stopped.

Here, the latch mechanism 2 takes the state shown in FIG. 5 and the rear end switch 26 and the buckle switch 30 are each maintained in its closed state. When the occupant closes the door again at this point of time, the movable anchor 1 reaches the occupant restraining position through the above-described course of operation.

A description will next be made of a procedure for adjusting the position of the latch mechanism 2 when the latch mechanism 2 is in the state shown in FIG. 1.

The position adjusting lever 34 of the position adjusting device is brought from the position shown in FIG. 3 to the position depicted in FIG. 6 against the urging force of the return spring 36. This causes the release switch 37 to be changed over to the upper side as viewed in FIG. 7. Since the front end switch 42 is in its closed state at this point of time, the relay 48 is brought into its excited state and a current is caused to flow through the motor 8 in the direction indicated by the solid arrow as described above. Accordingly, the movable anchor 1 starts moving toward the front end. Since this feeding of the current is effected only for a certain period of time preset by a timer 49, the movable anchor 1 is released from the latch mechanism 2 and is then stopped at a suitable position.

In parallel with the above-described operation, the adjustable anchor 32 is moved along the base 33 while maintaining the position adjusting lever 34 in the state depicted in FIG. 6. When the adjustable anchor 32 has brought to a desired position, the position adjusting lever 34 is returned to the state depicted in FIG. 3 so that the lock portion 34a is brought into engagement with another tooth 33a so as to hold the adjustable anchor 32 and latch mechanism 2 in place at the desired position. Since the movable anchor 1 has been released from the latch mechanism 2 at this point of time, the positional adjustment of the latch mechanism 2 can be conducted easily without being troubled by influence of undue loads.

When the position adjusting lever 34 has been returned to the state shown in FIG. 3, the release switch 37 is changed again to the lower side as viewed in FIG. 7. The relay 43 is then brought into an excited state and a current is caused to flow through the motor 8 in the direction indicated by the dashed arrow. As a result, the winding of the wire 4 is started and the movable anchor 1 returns to the occupant restraining position shown in FIG. 1, thereby regaining its state before the position adjustment. In this manner, the position-adjusted occupant restraining state is achieved.

By the way, a warning sound or the like is generated while the position adjustment is being conducted.

Figure 8:
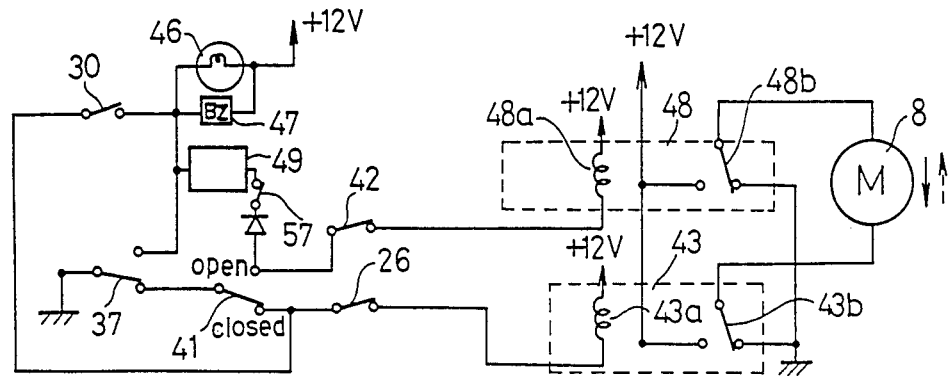
FIGS. 8 through 11 are circuit diagrams showing other examples of the electrical circuit.

FIG. 8 illustrates a circuit adapted to control the position adjusting device by also detecting a signal from a vehicle speed detection switch 57. This embodiment is different from that shown in FIG. 7 in that the vehicle detection switch 57, which is normally closed but is opened when the vehicle speed reaches, for example, 10 Km/hr and higher, is interposed between the timer 49 and the open-side terminal of the door switch 41. The motor 8 is not actuated while the vehicle is driven, even when the release switch 37 is operated.

The circuits shown respectively in FIGS. 7 and 8 are each adapted to move the movable anchor 1 for a predetermined period of time upon conducting a positional adjustment. A circuit adapted to allow the movable anchor 1 over a predetermined distance and then to stop it there is shown in FIG. 9.

Figure 9:
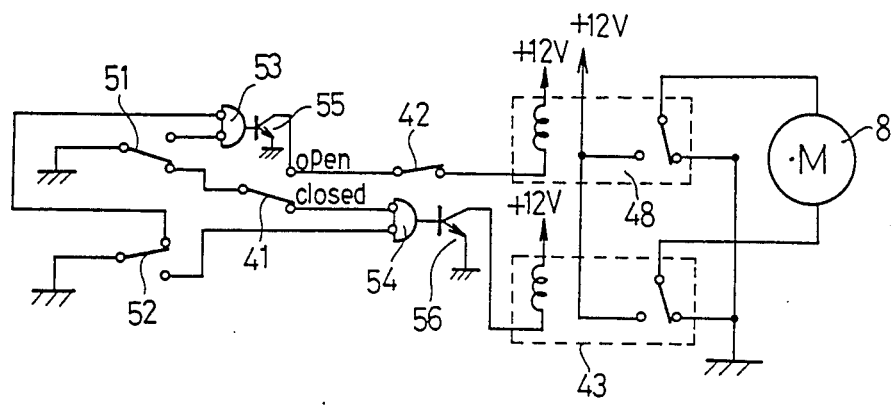

In FIG. 9, a release switch 51 is changed over to the upper side as viewed in FIG. 9 when the position adjusting lever 34 is operated. A rear end switch 52 is changed over to the upper side when the movable anchor 1 is at the occupant restraining position. Otherwise, the rear end switch 52 is changed over to the lower side. Numerals 53,54 indicate NOR gates respectively, while numerals 55,56 designate npn transistors respectively. The door switch 41, front end switch 42, relays 43,48 and motor 8 are operated in the same manner as in the circuits of FIGS. 7 and 8.

In the circuit of FIG. 9, the release switch 51 is changed over to the upper side when a positional adjustment is effected. Here, the front end switch 42 is in its closed state and the rear end switch 52 has been changed over to the upper side. Accordingly, the two input terminals of the NOR gate 53 are both grounded to 0. A signal 1 is hence applied form the output terminal of the NOR gate 53 to the base of the transistor 55, thereby making the transistor 55 conductive. The relay 48 is therefore brought into an excited state and a current is caused to flow downwardly through the motor 8 as viewed in FIG. 9, thereby causing the movable anchor 1 to move toward the front end. When the movable anchor 1 has moved over the predetermined distance, the rear end switch 52 as a moved distance detection means is changed over to the lower side so that the transistor 55 is rendered non-conductive to stop the motor 8.

When the position adjusting lever 34 has been returned to its deactivated state upon completion of the positional adjustment, the release switch 51 is changed over to the lower side as viewed in FIG. 9. Since the rear end switch 52 has also been changed over to the lower side, the two input terminals of the NOR gate 54 are grounded to 0 and a signal 1 is fed from the output terminal of the NOR gate 54 to the base of the transistor 56, thereby bringing the relay 43 into an excited state this time. A current is therefore caused to flow upwardly through the motor 8 as viewed in FIG. 9, thereby returning the movable anchor 1 to the occupant restraining position and holding it there. The other operation is substantially the same as in the circuits of FIGS. 7 and 8.

Figure 10:
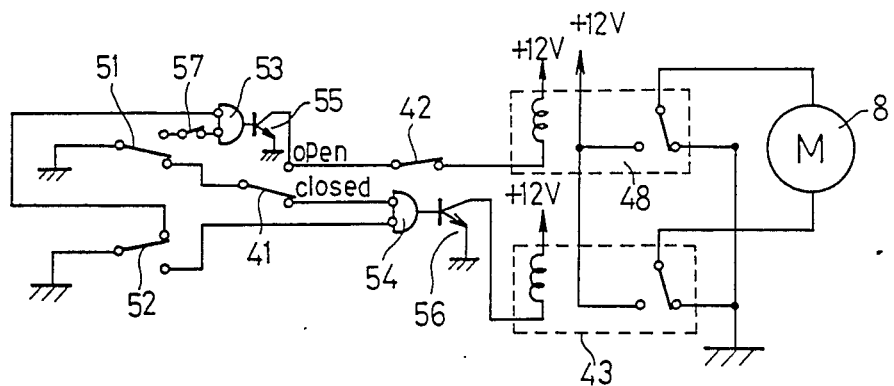

FIG. 10 illustrates another circuit adapted to control the position adjusting device by also detecting a signal from the vehicle speed detection switch 57. This embodiment is different from that shown in FIG. 9 in that the vehicle detection switch 57, which is normally closed but is opened when the vehicle speed reaches, for example, 10 Km/hr and higher, is interposed between the release switch 51 and one of the input terminals of the NOR gate 53. The motor 8 is not actuated while the vehicle is driven, even when the release switch 37 is operated.

Figure 11:
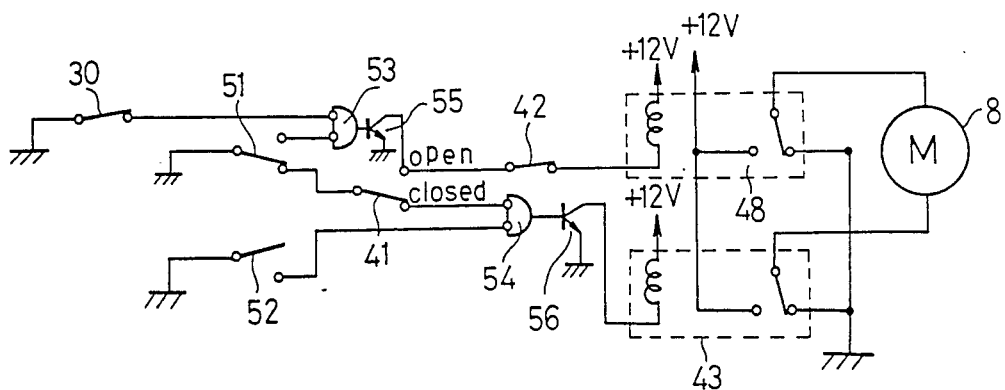

In each of the circuits of FIGS. 9 and 10, the buckle switch 30 may be used as a moved-distance detection means instead of the rear end switch 52. FIG. 11 is a circuit diagram of this modification. The buckle switch 30 is additionally incorporated. When a position adjustment is desired, the release switch 51 is changed over to the upper side as viewed in FIG. 11. When the tongue 58 has been latched in the buckle 16 and the movable anchor 1 is at the occupant restraining position at this point of time, the buckle switch 30 is changed over to the lower side as viewed in FIG. 11. Both of the input terminals of the NOR gate 53 are grounded to 0 and a signal 1 is output from the output terminal of the NOR gate 53. The subsequent operation is the same as that of the circuit shown in FIG. 9.

Upon completion of the positional adjustment, the release switch 51 is changed over to the lower side as viewed in FIG. 11. Since the rear end switch 52 has changed over to the lower side by this point of time, both of the two input terminals of the NOR gate 54 are grounded to 0 and a signal 1 is output from the output terminal of the NOR gate 54. The subsequent operation is the same as that of the circuit depicted in FIG. 9. As a further alternative, a still further switch may be provided at a suitable point on the guide rail 3, whereby each arrival of the movable anchor 1 to the above point is detected by the switch so as to stop the movable anchor 1.

Figure 12:
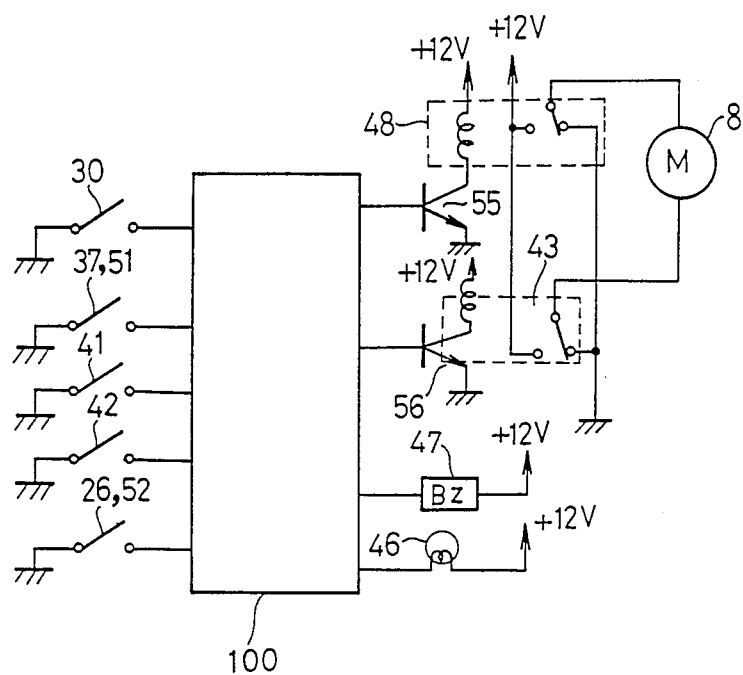
FIG. 12 is a circuit diagram of a still further electrical circuit making use of a controller.

FIG. 12 is a circuit diagram showing a still further embodiment in which the position adjusting device is controlled by a controller 100 such as a microcomputer. In accordance with signals from the respective input switches, signals are output from the controller 100 to the motor 8 and warning devices 46,47 so that the position adjusting device can perform the same function as that depicted in FIG. 7 or FIG. 9. In FIG. 12, the reference numerals common to those in FIG. 7 or FIG. 9 indicate like elements of structure.

Figure 13:
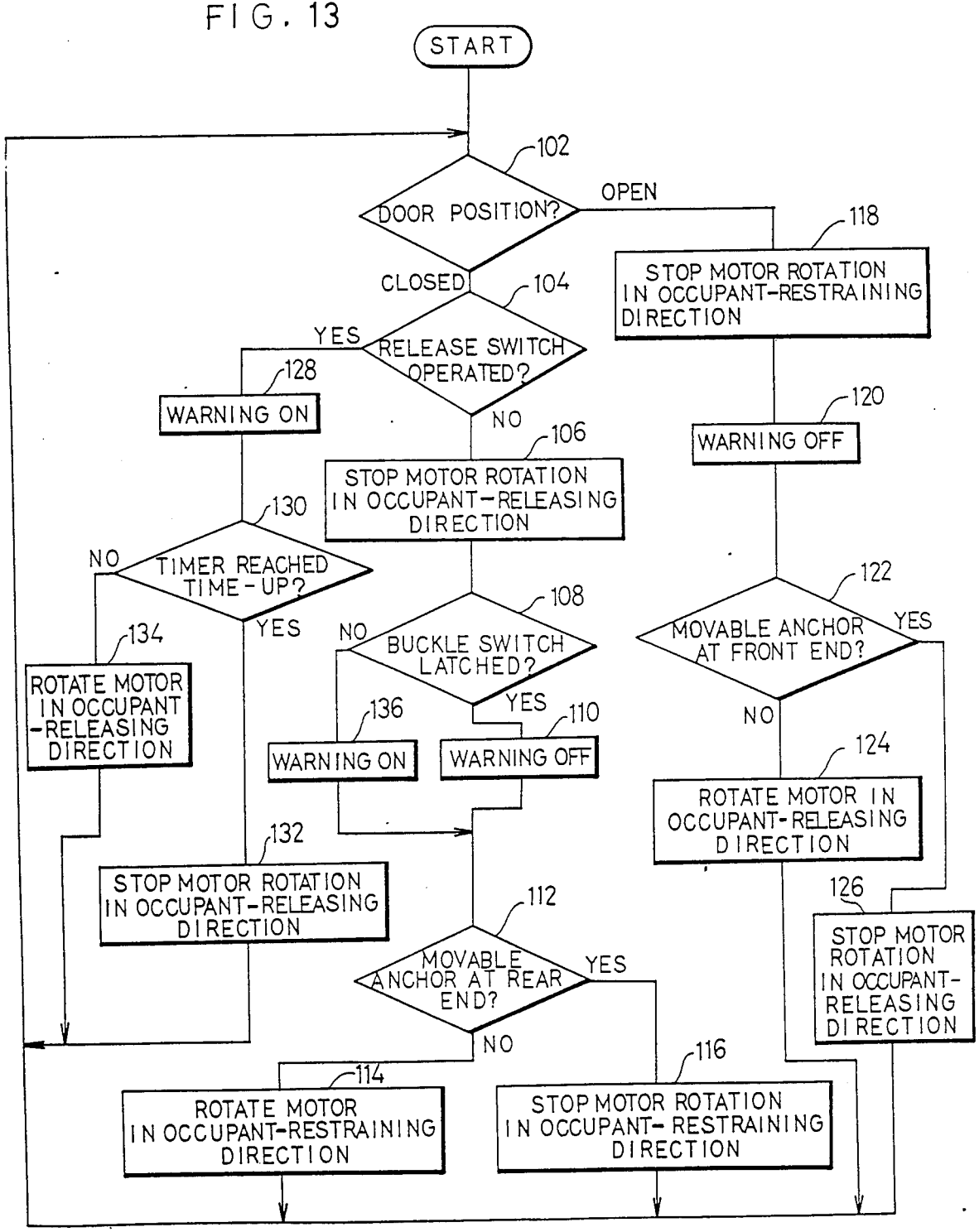
FIGS. 13 and 14 are flow charts corresponding respectively to the circuit diagrams of FIGS. 7 and 9.

FIG. 13 shows a flow chart, in which a circuit corresponding to that depicted in FIG. 7 is controlled by the controller 100. When the occupant rides on the vehicle and closes the door, the door switch 41 is closed. When the door is closed, the operation proceeds from Step 102 to Step 104. When the release switch 51 has not been operated, the operation proceeds to Step 106 and while stopping the motor 8, further to Step 108. When the buckle switch 30 is neither at the rear end and not latched, the operation proceeds to Step 136 and after generating warning, further to Step 112. When the movable anchor 1 is not at the occupant restraining position (rear end) in Step 112, the operation proceeds to Step 114 so that the the motor 8 is rotated in a direction in which the movable anchor 1 is moved toward the occupant restraining position. The movable anchor 1 again reaches the occupant restraining position through Steps 102–106. When the buckle 30 has been latched, the operation proceeds to Step 110 and the warning is stopped. The operation proceeds through Step 112 to Step 116, in which the rotation of the motor 8 is stopped.

When the occupant opens the door to get off the vehicle, the operation proceeds from Step 102 to Step 118. After preventing the motor 8 from rotating in a rearward direction (Step 118) and stopping the warning (Step 120), the operation proceeds to Step 122. When the movable anchor 1 is not at the front end, the operation proceeds from Step 122 to Step 124 so that the motor 8 is rotated in a direction in which the movable anchor 1 is moved toward the occupant releasing direction. The operation proceeds again through Step 102 and Step 122 and when the movable anchor 1 has reached the front end, the operation then proceeds from Step 122 to Step 126 so as to stop the operation of the motor 8.

When it is desired to adjust the occupant restraining position of the movable anchor 1, nothing is controlled when the door is open. When the door is closed, the operation proceeds from Step 104 to Step 128 and warning is hence generated. Until a predetermined period of time is lapsed, the operation proceeds from Step 130 to Step 134 so that the movable anchor 1 moves frontwards, and the operation then returns to Step 102. This loop is repeated. Upon a lapse of the predetermined period of time, the timer reaches time-up and the operation proceeds from Step 130 to Step 132, and the frontward movement of the motor 8 is hence stopped.

Upon completion of the positional adjustment, the release switch 37 is deactivated. Therefore, the operation proceeds from Step 104 to Step 106, and further to Step 108. Since the movable anchor 1 is not at the occupant restraining position, the buckle switch 30 is not latched. The operation thus proceeds from Step 108 to Step 136 so that the warning is continued. The operation then proceeds from Step 112 to Step 114, whereby the motor 8 causes the movable anchor 1 to move toward the occupant restraining position. When the movable anchor 1 reaches the occupant restraining position, the operation then proceeds to Step 110 so that the warning is stopped. The operation is thereafter allowed to proceed from Step 112 to Step 116, thereby stopping the motor 8.

When the positional adjustment has been completed within the predetermined period of time, the operation proceeds immediately from Step 104 to Step 106 so that the motor 8 is stopped. The operation proceeds further to Step 108 and then proceeds further in the same sequence as described above.

Figure 14:
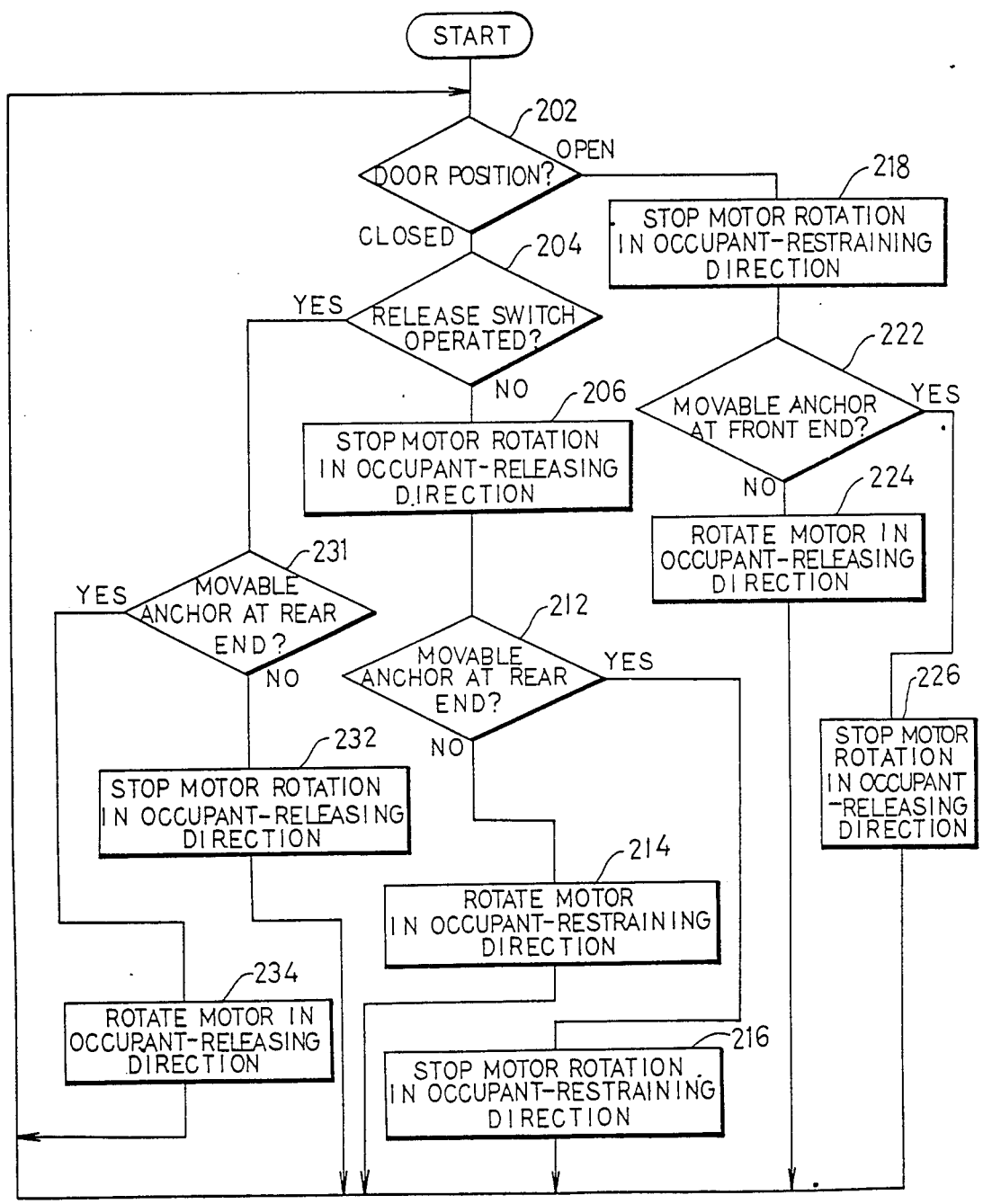

FIG. 14 illustrates a flow chart corresponding to FIG. 9, except that the position adjusting device is controlled by the controller 100. Its detailed description is however omitted, because it is substantially the same as FIG. 13 except that instead of Step 130 in FIG. 13, Step 231 is provided to determine whether the movable anchor 1 is at the rear end or not.

Figure 15:
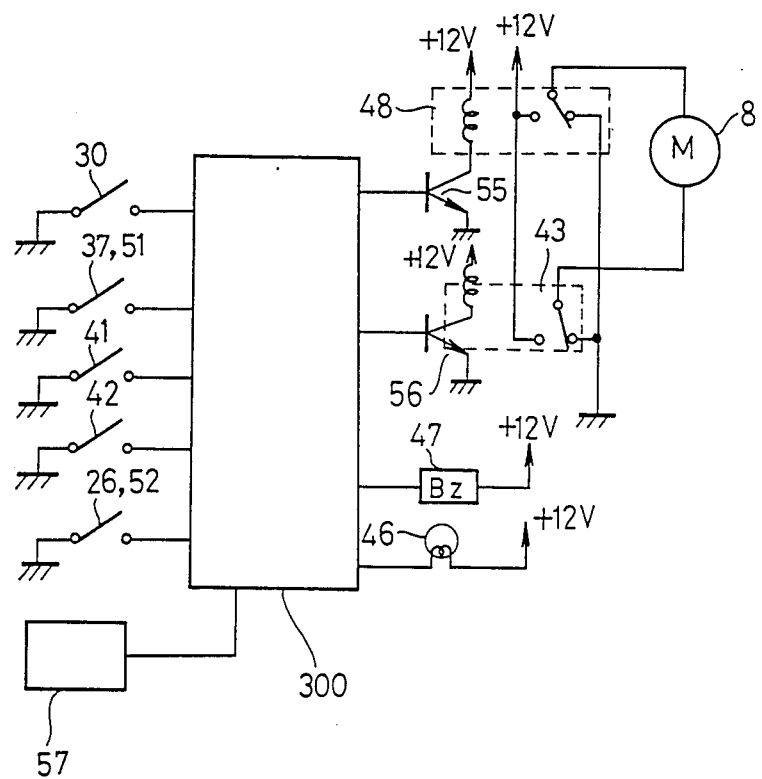
FIG. 15 is a circuit diagram of a still further electrical circuit making use of a controller.
Figure 16:
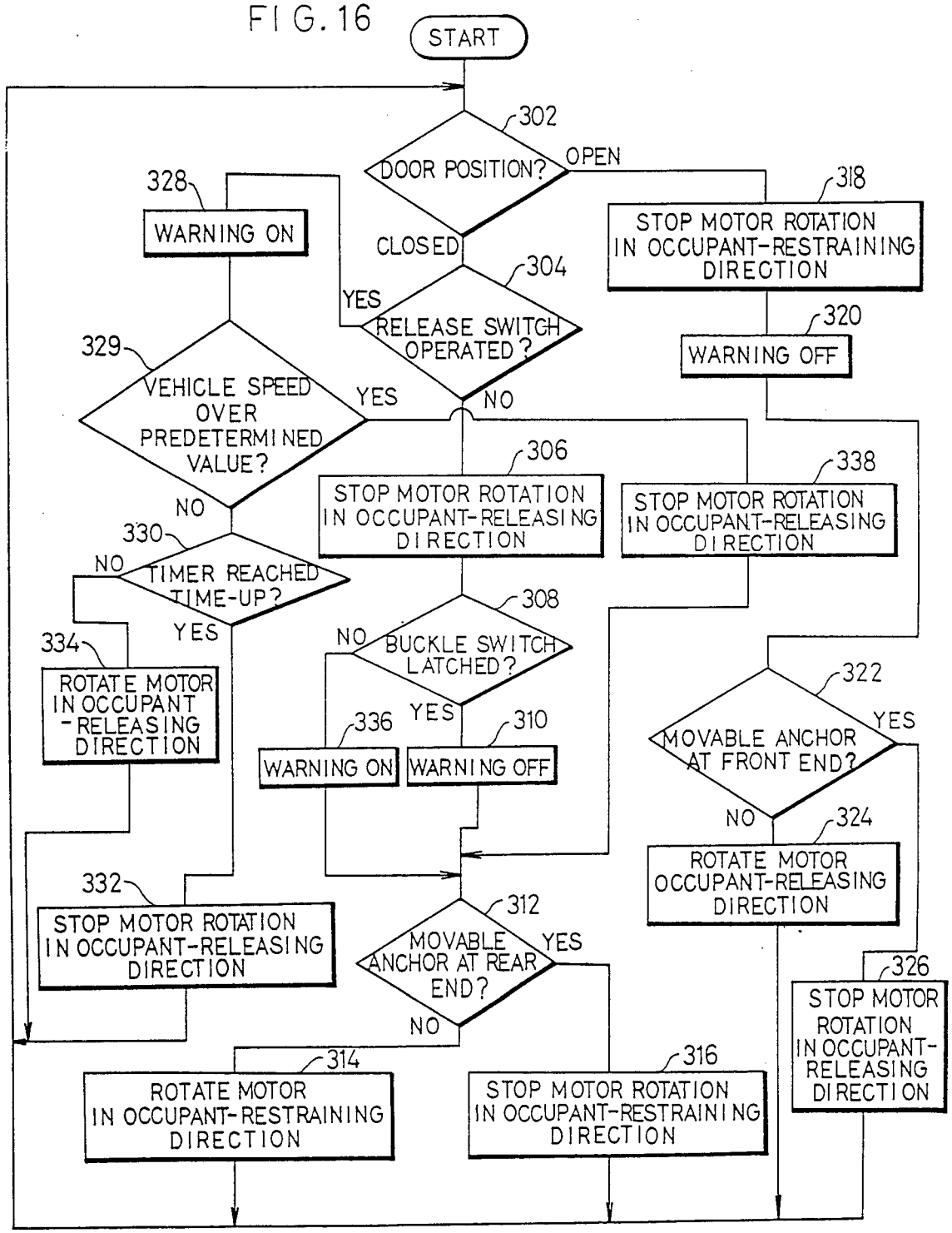
FIGS. 16 and 17 are flow charts corresponding respectively to the circuit diagrams of FIGS. 8 and 10.

FIG. 15 is a circuit diagram, in which a signal input from the vehicle speed detection means 57 is also detected so as to control the position adjusting device by a controller 300. FIG. 16 is a flow chart corresponding to FIG. 8 while FIG. 17 is a flow chart corresponding to FIG. 10.

In FIG. 16, Step 329 in which a judgement is made to determine whether the vehicle speed is below a preset value or not is interposed between Step 328, in which warning is generated when the release switch is operated, and Step 330 in which a judgement is made to determine whether the time has reached time-up or not. When the vehicle speed is above the preset value (in other words, the vehicle is driven), the operation proceeds to Step 338 so that the movable anchor 1 is prevented from moving frontwards. The other steps are the same as their corresponding steps in FIG. 13 and their description is therefore omitted herein.

Figure 17:
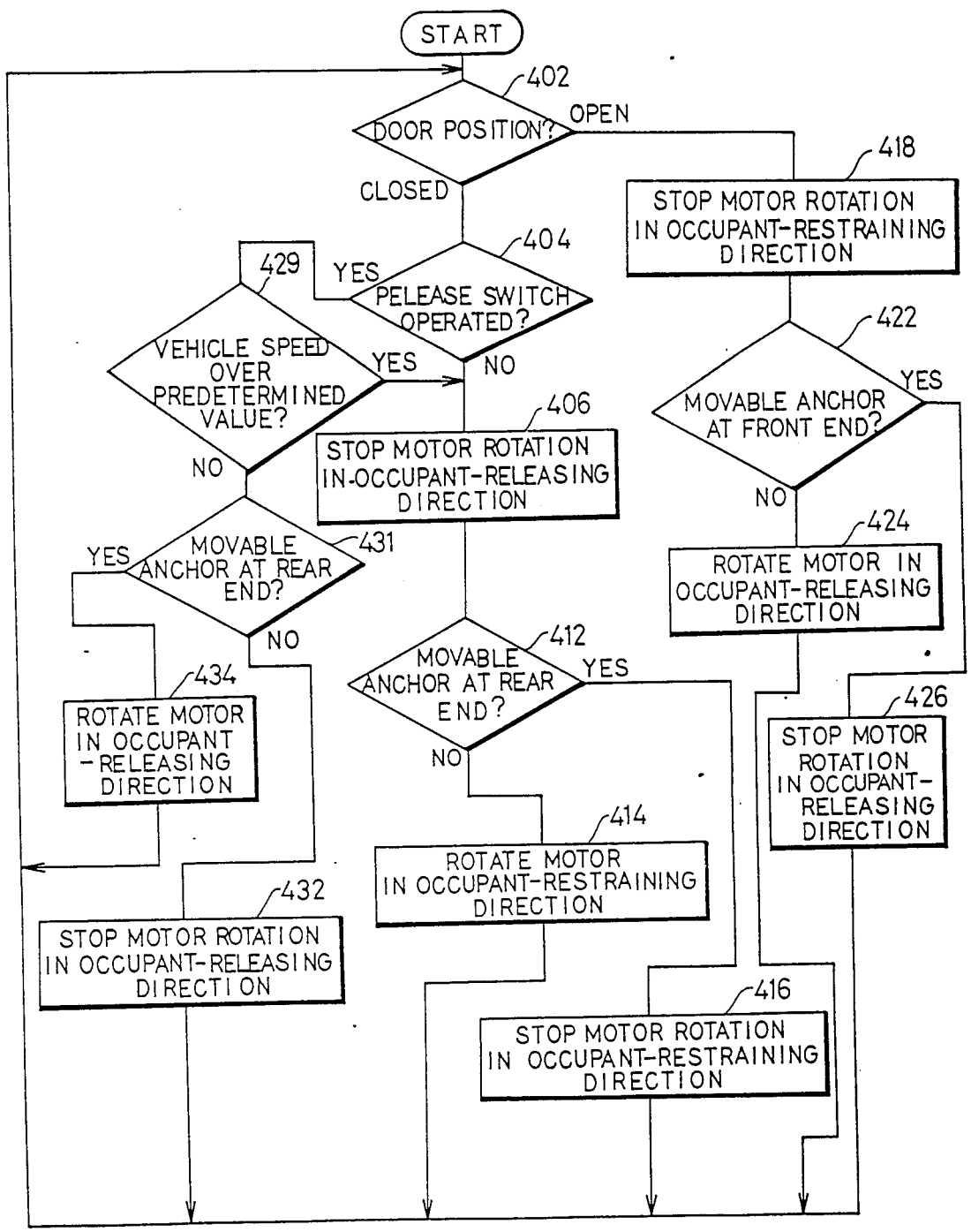

In FIG. 17, Step 429 in which a judgement is made to determine whether the vehicle speed is below a preset value or not is interposed between Step 404, in which a judgement is made whether the release switch has been operated or not, and Step 431 in which a judgement is made to determine whether the movable anchor 1 at the rear end or not. When the vehicle speed is above the preset value (in other words, the vehicle is driven), the operation proceeds from Step 429 to Step 406 so that the motor is not actuated. The other steps are the same as their corresponding steps in FIG. 14 and their description is therefore omitted herein.

Figure 18:
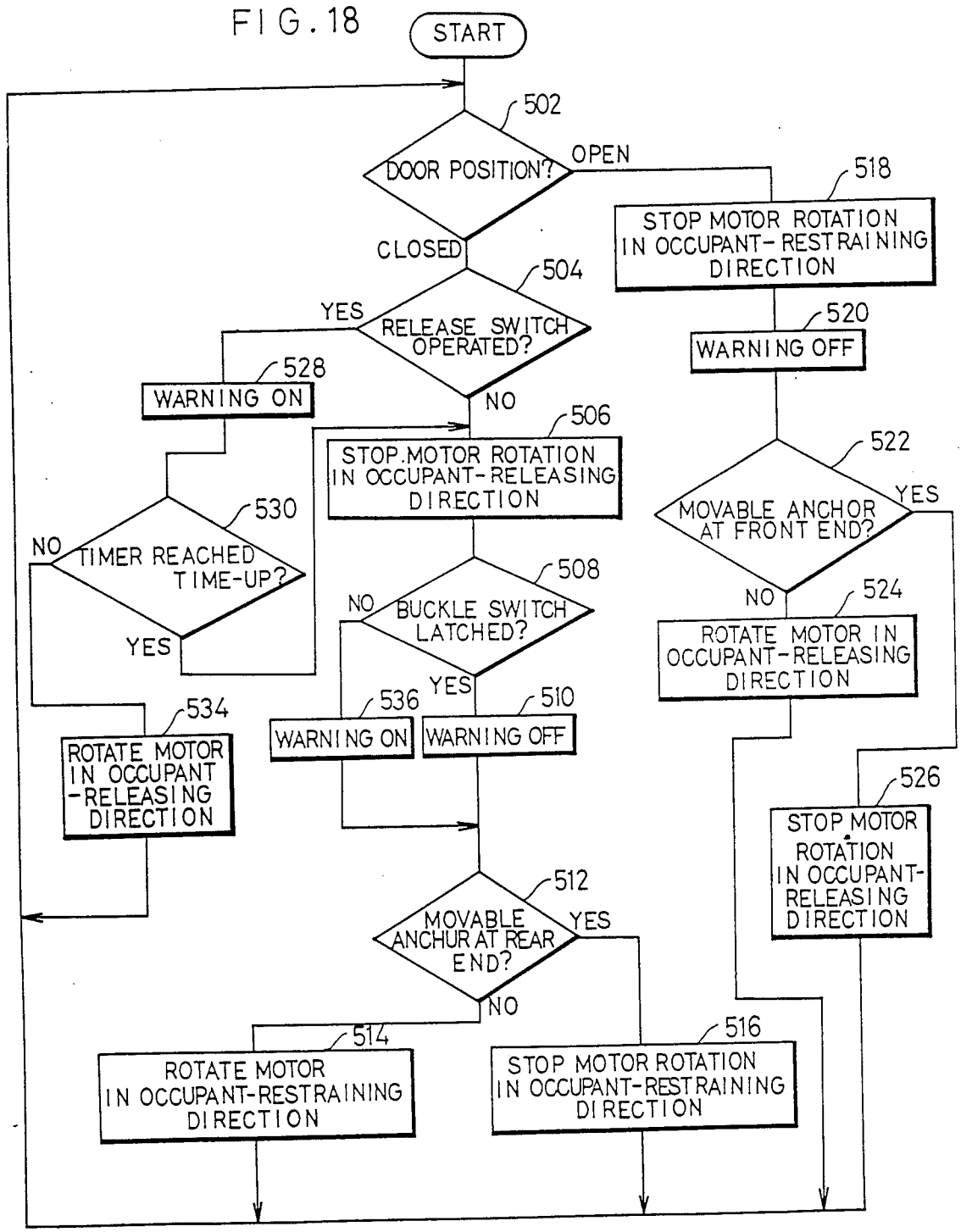
FIGS. 18 and 19 are flow charts of other examples.
Figure 19:
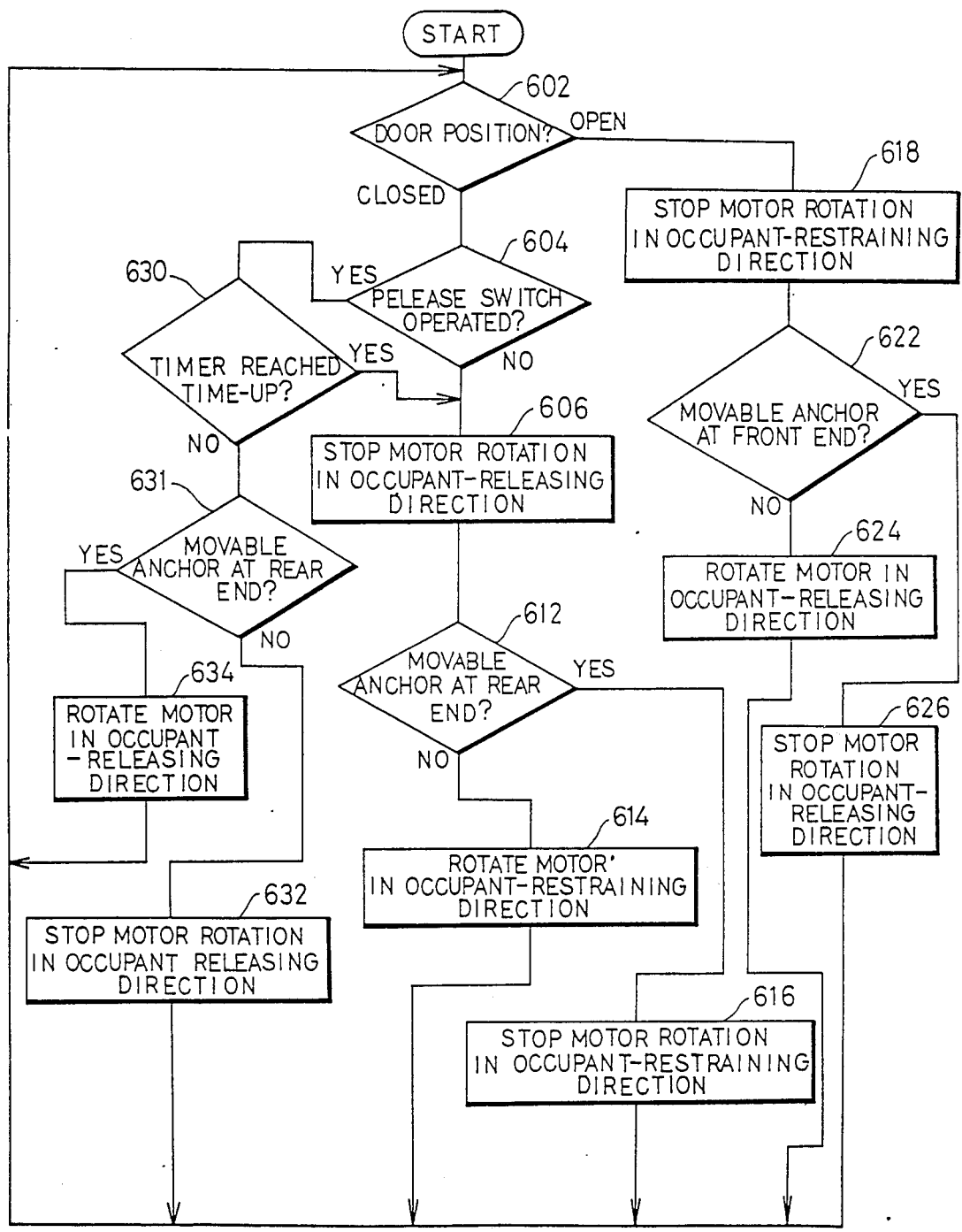

FIG. 18 is a flow chart for performing the same control as in FIG. 13. When a predetermined period of time has lapsed upon a positional adjustment, the operation proceeds from Step 530 to Step 506 and its subsequent steps (i.e., Step 106 and its subsequent steps in FIG. 13), whereby the movable anchor 1 is automatically brought to the occupant restraining position FIG. 19 is a flow chart for performing the same control as in FIG. 14. When the release switch 51 was operated and a predetermined period of time has then lapsed, the operation proceeds from Step 604, through Step 630, to Step 606 and its subsequent steps, whereby the movable anchor 1 is automatically brought to the occupant restraining position.

In the above embodiments, the operating means and lock member are composed of a single piece of member (the position adjusting lever 34). The operating means and lock member may however be formed as separate members or the operating means may be composed of a plurality of members, and the movement of any one of constituent members of the operating means and lock member may be detected by the release switch which constitutes the release means.

As the latch mechanism, the mechanism making use of the rollover latch member and anchor pin in combination has been described above. It is not however absolutely necessary to use them in combination. In some instances, either one of the rollover latch member and anchor pin (or the means for receiving and holding the movable anchor) may be used singly.

In addition, as the adjusting device, it may be possible to use such a device that each positional adjustment of the latch mechanism fixed on the side of an internally-threaded member is effected by actuating an externally-threaded member, which is maintained in threaded engagement with the internally-threaded member, electrically by means of a motor or the like. Here, the motor actuating switch constitutes a part of the release means.

For the release of the movable anchor, the release may be effected by actuating a drive means which is provided separately from the above-mentioned movable anchor drive means.

Having now fully described the invention, it will be apparent to one of ordinary skill in the art that many changes and modifications can be made thereto without departing from the spirit or scope of the invention as set forth herein.

I claim:

1. A position adjusting device for a movable anchor latch mechanism, comprising:
    a drive means for causing a movable anchor to move between an occupant releasing position and an occupant restraining position, thereby allowing an associated webbing to take an occupant releasing state and an occupant restraining state selectively;
    a latch mechanism for latching the movable anchor at the occupant restraining position when the movable anchor has reached the occupant restraining position;
    an adjusting means for fixing the latch mechanism at a desired position; and
    a release means for detecting that the adjusting means is about to be operated, whereby the movable anchor assuming the occupant restraining position is released from the occupant restraining position.

2. The position adjusting device as claimed in claim 1, wherein the release means releases the movable anchor from the occupant restraining position by way of the drive means.

3. The position adjusting device as claimed in claim 2, wherein the release means comprises a means for detecting that the adjusting means is about to be operated, and the detection means outputs an electrical signal to the drive means.

4. The position adjusting device as claimed in claim 1, wherein the release means comprises a timer and the release of the movable anchor is effected by moving the movable anchor for a predetermined period of time by the timer.

5. The position adjusting device as claimed in claim 4, wherein the release means comprises a timer and after a lapse of a predetermined period of time set by the timer, returns the movable anchor to the occupant restraining position.

6. The position adjusting device as claimed in claim 1, wherein the release means comprises a moved-distance detection means for detecting each movement of the movable anchor over a predetermined distance, and the release of the movable anchor is effected by moving the movable anchor over the predetermined distance in accordance with the moved-distance detection means.

7. The position adjusting device as claimed in claim 6, wherein the release means comprises a timer and after a lapse of a predetermined period of time set by the timer, returns the movable anchor to the occupant restraining position.

8. The position adjusting device as claimed in claim 6, wherein the moved-distance detection means is a rear end switch which is adapted to detect each arrival of the movable anchor at the occupant restraining position and then to prevent any further movement of the movable anchor.

9. The position adjusting device as claimed in claim 6, wherein the position adjusting device further comprises an emergency release buckle fixed on the movable anchor and a tongue which can be releasably latched in the buckle and is connected to the webbing, the moved-distance detection means is a buckle switch provided adjacent to the occupant restraining position of the movable anchor and adapted to detect whether the movable anchor is at the occupant restraining position or not when the tongue is latched in the buckle.

10. The position adjusting device as claimed in claim 3, wherein the drive means comprises a door switch which is brought to a first state in response to each opening of an associated door and to a second state in response to each closing of the associated door, and the detection means is electrically connected in series with the door switch.

11. The position adjusting device as claimed in claim 1, wherein the position adjusting device further comprises a means for detecting each vehicle speed and the release means is deactivated when the vehicle speed detection means has detected a vehicle speed of at least a predetermined value.

12. The position adjusting device as claimed in claim 1, further comprising a controller adapted to control the actuations of the drive means and release means.

13. The position adjusting device as claimed in claim 12, wherein the controller is a microcomputer.

14. A position adjusting device for a movable anchor latch mechanism, comprising:
a guide rail;
a movable anchor movable along the guide rail, said movable anchor carrying a webbing connected thereto;
a drive means for causing the movable anchor to move between an occupant restraining position, where the webbing restrains an occupant, and an occupant releasing position where the webbing is maintained out of engagement with the occupant;
a means for holding the movable anchor at the occupant restraining position;
a means for supporting the holding means in a state that the position of the holding means is adjustable; and
a means for actuating the movable anchor from the occupant restraining position toward the occupant releasing position upon operation of the support means.

15. The position adjusting device as claimed in claim 14, wherein the support means has an adjustable base with a plurality of engagement portions formed thereon, an adjustable anchor adapted to be guided along the adjustable base and carrying the holding means mounted thereon, and a position adjusting member provided movably on the adjustable anchor so as to assume an engagement position, where the position adjusting member is brought into engagement with any one of the engagement portions, and a non-engagement position where the position adjusting member is maintained out of engagement from all of the engagement portions.

16. The position adjusting device as claimed in claim 14, wherein the actuating means comprises an actuating switch which assumes a first state when the position adjusting device is at the engagement position and a second state when the position adjusting device is at the non-engagement position.

17. The position adjusting device as claimed in claim 16, wherein when the actuating switch assumes the second state, the actuating switch actuates the drive means to move the movable anchor toward the occupant releasing position.

18. The position adjusting device as claimed in claim 16, wherein the drive means comprises a door switch which is brought into a first state in response to each opening of an associated door and into a second state in response to each closing of the door, and the actuating switch is electrically connected in series with the door switch.

19. The position adjusting device as claimed in claim 14, wherein the position adjusting device further comprises a means for detecting each vehicle speed and the release means is deactivated when the vehicle speed detection means has detected a vehicle speed of at least a predetermined value.

20. A position adjusting device for a movable anchor latch mechanism, comprising:
a guide rail;
a movable anchor movable along the guide rail, said movable anchor carrying a webbing connected thereto;
a drive means for causing the movable anchor to move between an occupant restraining position, where the webbing restrains an occupant, and an occupant releasing position where the webbing is maintained out of engagement with the occupant, said occupant restraining position being adjustable;
a means for positioning the occupant restraining position at a desired position; and a means for generating warning while the positioning means is operated.

21. The position adjusting device as claimed in claim 20, wherein the warning generating means comprises a switch adapted to detect that the positioning means is being operated.

22. The position adjusting device as claimed in claim 21, wherein the positioning means has an adjustable base with a plurality of engagement portions formed thereon, an adjustable anchor adapted to be guided along the adjustable base and defining an anchor portion engageable with the movable anchor, and a position adjusting member provided on the adjustable anchor and being displaceable between an engagement position, where the position adjusting member is brought into engagement with any one of the engagement portions, and a non-engagement position where the position adjusting member is maintained out of engagement from all of the engagement portions, and the switch is adapted to detect each movement of the position adjusting member to the non-engagement position.

23. The position adjusting device as claimed in claim 20, wherein the position adjusting device further comprises an emergency release buckle fixed on the movable anchor, a tongue which can be releasably latched in the buckle and is connected to the webbing, and a buckle switch provided adjacent to the occupant restraining position of the movable anchor and adapted to detect whether the movable anchor is at the occupant restraining position or not when the tongue is latched in the buckle, and the buckle switch is electrically connected with the warning generating means.

24. The position adjusting device as claimed in claim 20, further comprising a controller adapted to control the actuations of the drive means and release means.

25. The position adjusting device as claimed in claim 12, wherein the controller is a microcomputer.

* * * * *